Figure 4A:
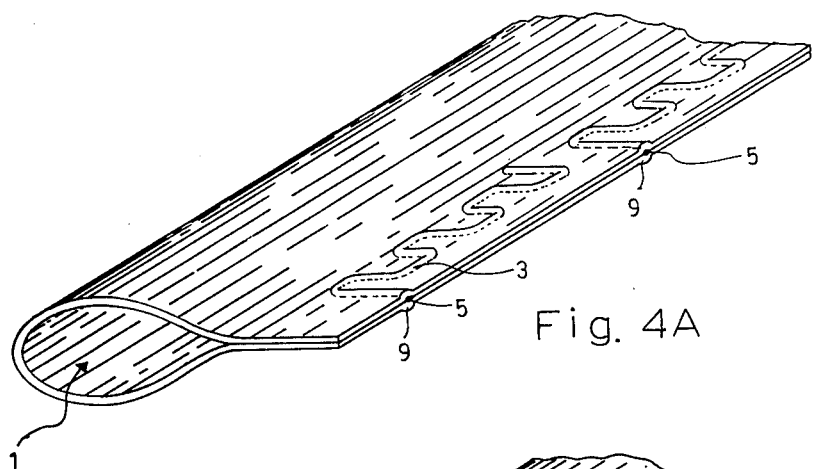

United States Patent [19]

Leal-Diaz

[11] 4,047,995

[45] Sept. 13, 1977

[54] HOSES FOR IRRIGATION BY DRIPPING AND THE LIKE AND THE PROCESS TO MANUFACTURE THE SAME

[76] Inventor: Jaime Leal-Diaz, Escobedo Sur 733-201, Monterrey, Nuevo Leon, Mexico

[21] Appl. No.: 654,542

[22] Filed: Feb. 2, 1976

[51] Int. Cl.² .................................................. B05B 1/14
[52] U.S. Cl. ................................. 156/203; 156/217; 156/290; 156/582; 239/542
[58] Field of Search ............... 239/542, 183, 195, 553, 239/553.3, 553.5, 568, 547; 428/157, 166, 194, 198; 181/350; 156/290, 198, 291, 580–583, 203, 217

[56] References Cited
U.S. PATENT DOCUMENTS

| | | | |
|---|---|---|---|
| 2,262,493 | 11/1941 | Guinzberg | 156/582 X |
| 2,566,833 | 9/1951 | Healy | 239/547 X |
| 3,698,195 | 10/1972 | Chapin | 239/542 X |
| 3,774,850 | 11/1973 | Zeman | 239/542 |
| 3,896,999 | 7/1975 | Barragan | 239/542 X |

Primary Examiner—Evon C. Blunk
Assistant Examiner—Michael Mar
Attorney, Agent, or Firm—Laurence R. Brown

[57] ABSTRACT

The present invention refers to hoses for irrigation by dripping and the like and to the manufacturing processes for the same. Thin plastic film produces a hose which in a single unit lies flat while empty, and oval or round when water under pressure enters along the same. The characteristics of primary conduction derivation or draining, pressure reduction and exit by dripping and the like result from the simple act of sealing a plastic film while imprinting enclosure circuits of various shape on overlapped edge sections of the hose.

1 Claim, 8 Drawing Figures

U.S. Patent  Sept. 13, 1977  4,047,995
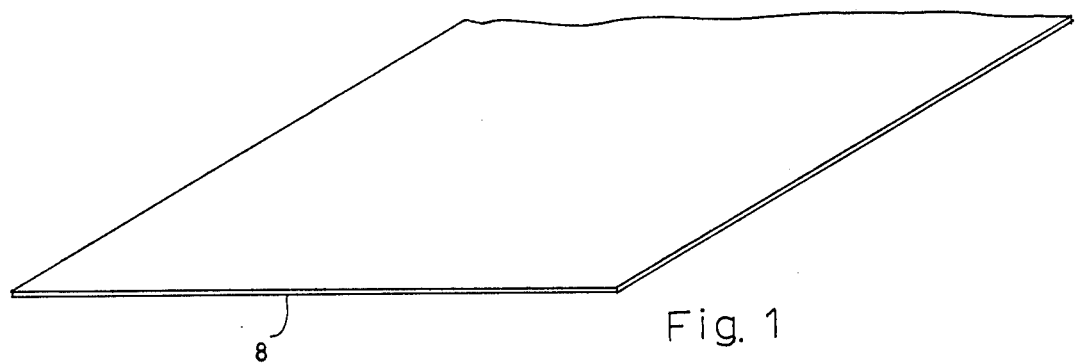
Fig. 1
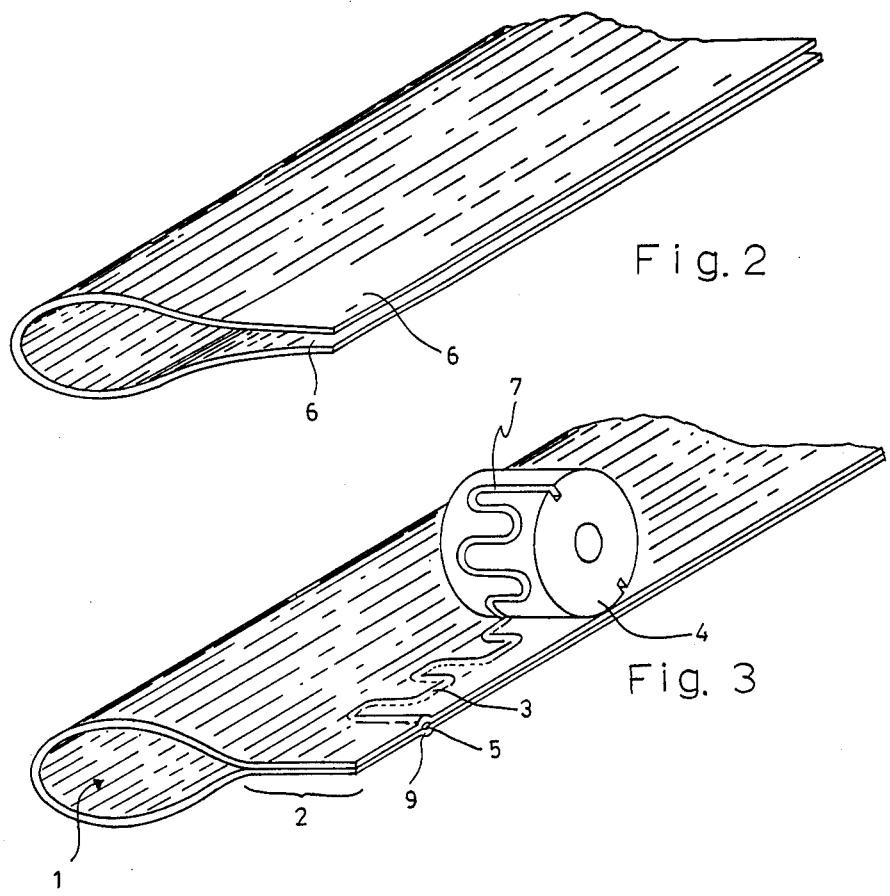
Fig. 2
Fig. 3

HOSES FOR IRRIGATION BY DRIPPING AND THE LIKE AND THE PROCESS TO MANUFACTURE THE SAME

The present invention refers to hoses for irrigation by dripping and the like and to the manufacturing processes for the same, using their plastic film by means of the procedure which will be described later on to produce a hose which in a single unit lies flat while empty, and oval or round when water under pressure enters. The characteristics of primary conduction are combined with derivation or draining, pressure reduction and exit by dripping and the like from the simple act of sealing two end sections overlapped of a plastic film and thereby imprinting enclosure circuits of various shape on the derivation or draining section of the hose.

The purpose of the present invention is to avoid the disadvantages resulting from the processes used to date to manufacture hoses for irrigation by dripping and the like which in all cases require the combination of various units in a plastic hose with thick walls, or the combination of secondary ducts forming a single unit with the hose but which require as raw material thick gauge plastic which makes them consequently expensive, difficult to handle and much more difficult to store; or puncturing and sealing cavities to allow or prevent derivation or draining from the main duct to the outside.

By means of the present invention it is possible to use thin film, which when processed as will be described later, gives as a result a hose which precisely eliminates the disadvantages mentioned in the previous paragraph since its cost is truly low; its handling is easy and its storage very compact.

The characteristic details of the present invention are clearly shown in the following description and in the drawings which accompany it as an illustration of preferred embodiments using the same reference symbols to point out the same parts in the figures shown.

FIG. No. 1 shows a perspective view of a piece of outstretched film.

FIG. No. 2 shows the same piece of film folded into one of the many ways for the construction of the hose.

FIG. No. 3 shows the passage of a heated roller over a portion of the film.

Figure 4B:
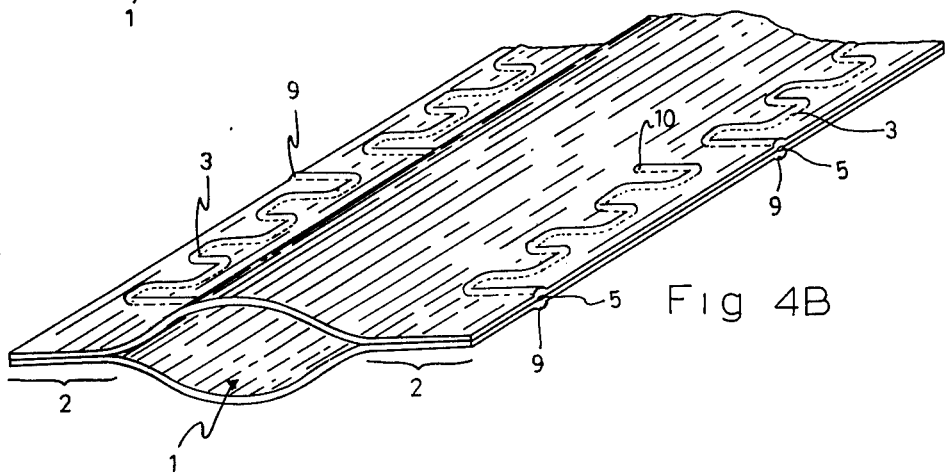
Figure 4C:
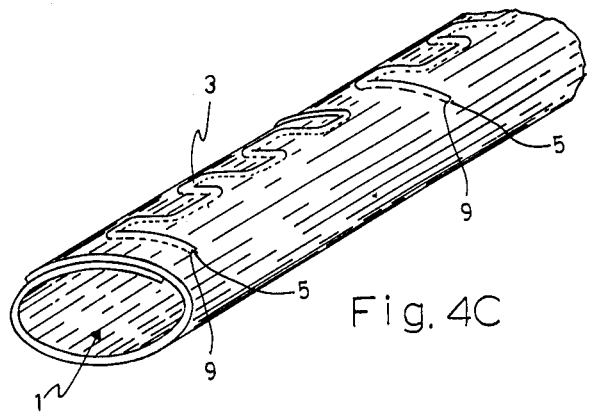
Figure 4D:
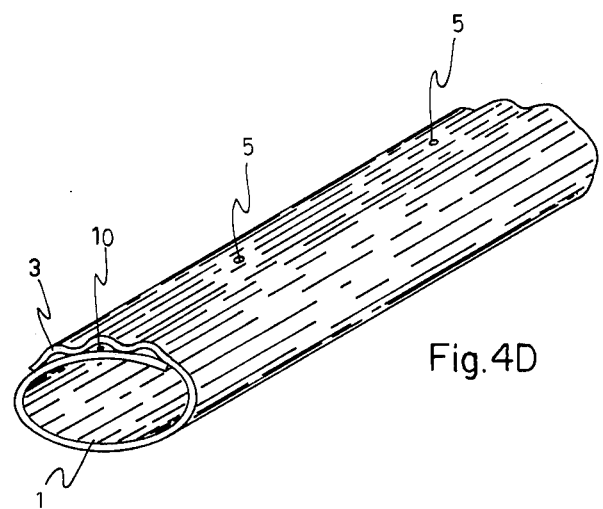
Figure 5:
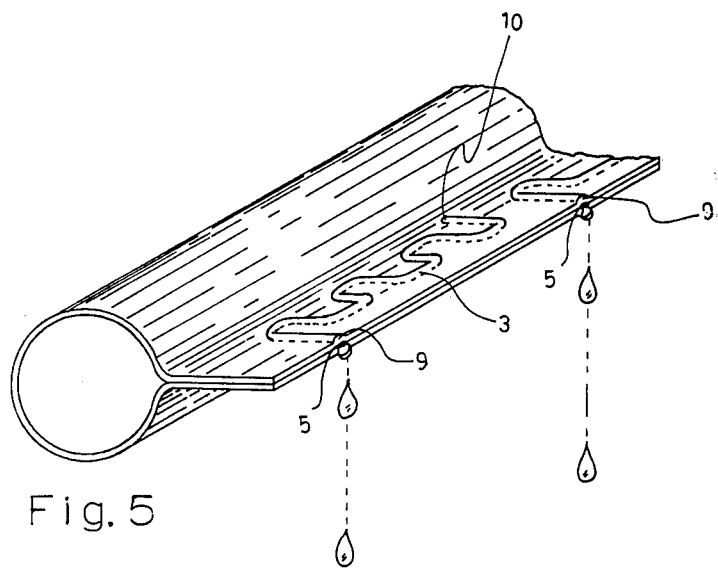

FIGS. 4A, 4B, 4C and 4D show some of the variant how the flaps or joints may be made.

FIG. No. 5 shows an expanded hose by the passage of fluid along the same and its derivations or drains dripping for irrigation.

With reference to said figures, this hose is formed by the combination of a primary duct 1 which when manufactured from plastic film 8 forms a single unit with the flap or joint 2 which contain the ducts or secondary derivations or drains 3. The primary duct 1 as well as the flap or joint 2 and the secondary ducts 3 are the result of the vulcanization or cementation of the plastic film to itself, by using a mechanism 4, preferably rollers or pressers, which through heat, vibration or adhesives seals the film to itself joining the lengthwise edges 6 of the film to form the flap or joint 2.

The rollers 4 have on their surface a series of ribs, structures or grooves 7 or figures which arranged in various ways produce along the flap or joint 2 the secondary ducts 3.

It is well known that the sealing between plastic films by means of heat, vibration or adhesives is done only in those areas which are directly in contact with the vulcanizing or cementing unit 4. The rollers 4 having ribs, grooves or structures 7 keep the entire surface of the element 4 from coming in contact with the surface of the flap or joint 2 causing the sealing or cementation or vulcanization between the layers of film 8 to be caused only in the specified areas. In those areas where the ribs, structure or groove 7 are located the sealing or vulcanization is not effected, enabling then the longitudinal edges 6 in those areas to separate, allowing the passage of fluid which drains toward the secondary ducts 3 through the opening 10 of the duct to be expelled through the exit 9.

Due to the fact that said ducts 3 may take on the shapes which are considered appropriate, it is possible to produce circumrotations along the same, which allow pressure reduction and regulation of the fluid turbulence, in such a manner that drops, streams or sprinkling is gotten through the exit opening 5.

Said hoses thus manufactured when empty take on a total or partly flat shape, which allows them to be rolled in a very simple fashion, and thus occupy reduced space in storage.

It is important to take into consideration that the joining of the plastic film can be achieved by the means described or through any known means among which can be mentioned thermal sealing, adhesive, heat action, pressure, vibrations, radiation or ultrasonic action; likewise it is not the intent of my client to limit the scope of his invention to the figures shown, nor to the description and the processes mentioned, but to claim for himself any mechanism which following the described principles produce the same industrial results.

What I claim is:

1. The method of manufacturing irrigation hoses for dripping and the like comprising forming a primary flow duct from a thin plastic film having overlapped layers and passing a smooth roller with at least one groove defined therein over said overlapped layer of plastic film, said smooth roller portion sealing the overlapped layer of plastic and forming said primary flows duct while said at least one groove forming a secondary unsealed, fluid passage therebetween leading from said primary flow duct to an exit position at the edge of said overlapped layers.

* * * * *